(12) United States Patent
Moshayedi

(10) Patent No.: US 12,250,339 B2
(45) Date of Patent: Mar. 11, 2025

(54) METHOD AND SYSTEM FOR COMMUNICATION CONTROL

(71) Applicant: Granite Telecommunications, LLC, Quincy, MA (US)

(72) Inventor: Kevan Moshayedi, Irvine, CA (US)

(73) Assignee: GRANITE TELECOMMUNICATIONS, LLC, Quincy, MA (US)

( * ) Notice: Subject to any disclaimer, the term of this patent is extended or adjusted under 35 U.S.C. 154(b) by 0 days.

(21) Appl. No.: 18/348,021

(22) Filed: Jul. 6, 2023

(65) Prior Publication Data

US 2024/0015244 A1 Jan. 11, 2024

Related U.S. Application Data

(60) Provisional application No. 63/359,576, filed on Jul. 8, 2022.

(51) Int. Cl.
*H04M 3/12* (2006.01)
*H04M 1/72418* (2021.01)
*H04M 3/51* (2006.01)

(52) U.S. Cl.
CPC ......... *H04M 3/12* (2013.01); *H04M 1/72418* (2021.01); *H04M 3/5116* (2013.01)

(58) Field of Classification Search
CPC ... H04M 3/12; H04M 1/72418; H04M 3/5116
See application file for complete search history.

(56) References Cited

U.S. PATENT DOCUMENTS

| 5,185,782 A * | 2/1993 | Srinivasan | H04M 3/523 |
| | | | 379/88.2 |
| 6,430,176 B1 * | 8/2002 | Christie, IV | H04M 7/1295 |
| | | | 379/900 |

(Continued)

OTHER PUBLICATIONS

"Ooma AirDial enables organizations to save money, and keep using critical alarm, safety, building access and fax systems by migrating from copper-based phone lines to an intelligent all-in-one solution that runs on a hassle-free wireless network", Ooma, Apr. 4, 2024, 4 pages.

(Continued)

*Primary Examiner* — Solomon G Bezuayehu
(74) *Attorney, Agent, or Firm* — Hamilton, Brook, Smith & Reynolds, P.C.

(57) ABSTRACT

Embodiments include methods, systems, and computer program products for communication control. One such embodiment receives a telephone call from a plain old telephone service (POTS) device. The telephone call includes a telephone number corresponding to a destination device. Next, a ringing tone is provided to the POTS device and the telephone number is transmitted to a proxy agent. A message is received from the proxy agent. The message indicates that a telephonic connection has been established between the proxy agent and the destination device. Responsive to receiving the message from the proxy agent, a real-time communications connection between the POTS device and the destination device is created by providing answer signaling for the received telephone call to the POTS device.

14 Claims, 12 Drawing Sheets

(56) References Cited

U.S. PATENT DOCUMENTS

| | | | |
|---|---|---|---|
| 6,704,404 B1 * | 3/2004 | Burnett | H04M 3/523 379/209.01 |
| 7,099,301 B1 * | 8/2006 | Sheu | H04L 65/103 379/218.01 |
| 7,209,447 B1 * | 4/2007 | Marsh | H04L 65/80 370/232 |
| 7,570,630 B1 * | 8/2009 | Phillips | H04L 65/80 370/352 |
| 7,792,061 B2 | 9/2010 | Lowekamp | |
| 8,081,751 B1 * | 12/2011 | Martin | H04M 3/42017 455/567 |
| 8,369,311 B1 * | 2/2013 | Kirchhoff | H04M 3/42263 370/352 |
| 8,515,021 B2 | 8/2013 | Farrand et al. | |
| 8,804,697 B1 | 8/2014 | Capper et al. | |
| 9,225,626 B2 | 12/2015 | Capper et al. | |
| 9,319,531 B1 | 4/2016 | Capper et al. | |
| 9,386,148 B2 | 7/2016 | Farrand et al. | |
| 9,426,288 B2 | 8/2016 | Farrand et al. | |
| 9,560,198 B2 | 1/2017 | Farrand et al. | |
| 9,560,210 B1 * | 1/2017 | Noble, Jr. | H04M 15/60 |
| 9,667,782 B2 | 5/2017 | Farrand et al. | |
| 10,135,976 B2 | 11/2018 | Farrand et al. | |
| 10,469,556 B2 | 11/2019 | Frame et al. | |
| 10,553,098 B2 | 2/2020 | Hart et al. | |
| 10,728,386 B2 | 7/2020 | Farrand et al. | |
| 10,986,555 B1 | 4/2021 | Moshayedi | |
| 11,171,875 B2 | 11/2021 | Osterlund et al. | |
| 11,315,405 B2 | 4/2022 | Hart et al. | |
| 11,316,974 B2 | 4/2022 | White et al. | |
| 11,330,100 B2 | 5/2022 | White et al. | |
| 2002/0064186 A1 * | 5/2002 | Aoyagi | H04M 7/006 704/E19.002 |
| 2003/0228012 A1 * | 12/2003 | Williams | H04Q 3/66 379/212.01 |
| 2005/0048967 A1 * | 3/2005 | Hoglander | H04Q 3/0025 455/445 |
| 2005/0180323 A1 * | 8/2005 | Beightol | H04L 47/43 370/230 |
| 2006/0218286 A1 * | 9/2006 | Brombal | H04M 7/129 709/227 |
| 2006/0256949 A1 * | 11/2006 | Noble | H04M 3/5231 379/266.01 |
| 2007/0206738 A1 * | 9/2007 | Patel | H04M 3/16 379/93.24 |
| 2007/0274294 A1 * | 11/2007 | Sasaki | H04L 65/1104 370/352 |
| 2007/0286372 A1 * | 12/2007 | DeMent | H04M 15/06 379/142.01 |
| 2008/0056241 A1 * | 3/2008 | Haddad | H04L 65/1104 370/352 |
| 2008/0112397 A1 * | 5/2008 | Kumarasamy | H04L 65/104 370/356 |
| 2008/0298799 A1 * | 12/2008 | Takihiro | H04L 12/287 398/2 |
| 2009/0213999 A1 | 8/2009 | Farrand et al. | |
| 2010/0241694 A1 * | 9/2010 | Jensen | H04L 67/1095 709/203 |
| 2012/0309369 A1 * | 12/2012 | Inapakolla | H04M 3/42 455/414.1 |
| 2013/0136241 A1 * | 5/2013 | Dillon | H04M 3/42195 379/45 |
| 2013/0294443 A1 * | 11/2013 | Kahn | H04M 7/0075 370/352 |
| 2013/0337773 A1 * | 12/2013 | Nozulak | H04L 63/18 455/411 |
| 2016/0065739 A1 * | 3/2016 | Brimshan | H04M 3/5231 379/88.01 |
| 2017/0332279 A1 * | 11/2017 | Kobayashi | H04L 47/805 |
| 2018/0146088 A1 * | 5/2018 | Moshir | H04W 4/50 |
| 2021/0075831 A1 * | 3/2021 | Arai | H04W 4/16 |

OTHER PUBLICATIONS

"Ooma AirDial gives you reliable phone service over a dedicated wireless network to provide emergency calling and other capabilities", Ooma, Oct. 28, 2021, 2 pages.

"The New Advanced Pots in a Box (Registered) CDS-9010", Data Remote, Datasheet CDS-9010, Aug. 2020, 2 pages.

"The New Advanced Pots in a Box (Registered) CDS-9090", Data Remote, Datasheet CDS-9090, Aug. 2020, 2 pages.

"The Pots in a Box (Registered) Solution", Data Remote, Datasheet DRI-9080, May 2019, 2 pages.

* cited by examiner

551 TYPE: ContactID
PASS
HIDE DETAILS
COPY

| | TONE TYPE 552 | TONE FREQUENCY 553 | START ms 554 | END ms 555 | LENGTH MS 556 | SQUELCH THRESH 557 | SQUELCH MS RESPONSE 558 |
|---|---|---|---|---|---|---|---|
| 559a | SIGNAL | 1400 | 9994 | 10994 | 1000 | 0.0125 | 2 |
| 559b | SIGNAL | 2300 | 14210 | 14304 | 94 | 0.0125 | 2 |
| 559c | DTMF | DTMF2 | 14360 | 14420 | 60 | 0.025 | 20 |
| 559d | DTMF | DTMF1 | 14480 | 14520 | 40 | 0.025 | 20 |
| 559e | DTMF | DTMF1 | 14580 | 14640 | 60 | 0.025 | 20 |
| 559f | DTMF | DTMF5 | 14700 | 14760 | 60 | 0.025 | 20 |
| 559g | DTMF | DTMF1 | 14820 | 14860 | 40 | 0.025 | 20 |
| 559h | DTMF | DTMF8 | 14920 | 14980 | 60 | 0.025 | 20 |
| 559i | DTMF | DTMF1 | 15040 | 15100 | 60 | 0.025 | 20 |
| 559j | DTMF | DTMF3 | 15160 | 15200 | 40 | 0.025 | 20 |
| 559k | DTMF | DTMF1 | 15260 | 15320 | 60 | 0.025 | 20 |
| 559l | DTMF | DTMF1 | 15380 | 15440 | 60 | 0.025 | 20 |

FIG. 5

METHOD AND SYSTEM FOR COMMUNICATION CONTROL

RELATED APPLICATION

This application claims the benefit of U.S. Provisional Application No. 63/359,576, filed on Jul. 8, 2022. The entire teachings of the above application are incorporated herein by reference.

BACKGROUND

Plain old telephone system (POTS)-based services include so-called "Life Safety" applications such as fire and burglar/safety alarms, elevator phones, and entry systems, among other examples.

SUMMARY

POTS-based services, e.g., Life Safety applications, may be sensitive to latency. When such services are switched to, e.g., a Managed Facility Voice Network (MFVN), which may be fiber- or LTE (Long-Term Evolution)-based, these services may encounter latency and other issues during transmissions between (i) a customer appliance, such as a MFVN device, which may support, e.g., a fire or alarm panel, and (ii) a controller, which may support, e.g., a corresponding fire or alarm monitoring station. Embodiments deliver functionality to overcome issues occurring with transmissions by POTS-based services, such as Life Safety applications, among other examples. For instance, embodiments can provide interfacing of POTS devices over, e.g., Internet Protocol (IP), connections via a network.

One such example embodiment is directed to a computer-implemented method for communication control. The method begins by receiving a telephone call from a POTS device, e.g., a burglar/security/elevator/fire alarm, an emergency call box, an elevator phone, an access control/entry system, or any other suitable POTS device known in the art. The telephone call includes a telephone number corresponding to a destination device. Next, the method provides a ringing tone to the POTS device. The method then transmits the telephone number to a proxy agent. A message is received from the proxy agent. The message indicates that a telephonic connection has been established between the proxy agent and the destination device. Responsive to receiving the message from the proxy agent, the method creates a real-time communications connection between the POTS device and the destination device by providing answer signaling for the received telephone call to the POTS device.

In an aspect, the method further includes monitoring transmissions on the real-time communications connection between the POTS device and the destination device. Responsive to the monitoring, the method can identify error(s) in a given transmission.

According to an implementation, error(s) in a given transmission are identified based on a discrepancy between a communications protocol, e.g., IP, TCP (Transmission Control Protocol), UDP (User Datagram Protocol), HTTP (Hypertext Transfer Protocol), Contact ID, NFPA (National Fire Protection Association) 72®, FSK (frequency-shift keying), and/or BF SK (binary FSK), and the given transmission. In an embodiment, the method further includes correcting the one or more errors by modifying the given transmission to be in accordance with the communications protocol.

According to an aspect, the one or more errors include a missing packet, an out-of-order packet, or a mistimed or delayed packet, among other examples.

In an implementation, the method further includes correcting the one or more errors in the given transmission. According to an embodiment, the method corrects the one or more errors in the given transmission by inserting one or more packets into the given transmission, reordering one or more packets of the given transmission, or modifying a tone frequency of one or more packets of the given transmission.

In an aspect, the method further includes creating a secure tunnel by encrypting the real-time communications connection.

Another example embodiment is directed to a computer-based system for communication control. The system includes a processor and a memory with computer code instructions stored thereon. In such an embodiment, the processor and the memory, with the computer code instructions, are configured to cause the system to implement any embodiments or combination of embodiments described herein.

Yet another example embodiment is directed to a non-transitory computer program product for communication control. The computer program product includes a computer-readable medium with computer code instructions stored thereon. In such an embodiment, the computer code instructions are configured, when executed by a processor, to cause an apparatus associated with the processor to implement any embodiments or combination of embodiments described herein.

It is noted that embodiments of the method, system, and computer program product may be configured to implement any embodiments, or combination of embodiments, described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 is a user interface displaying a set of tones sent and/or received as part of a telephone call subject to control by an example embodiment.

DETAILED DESCRIPTION

Figure 1:
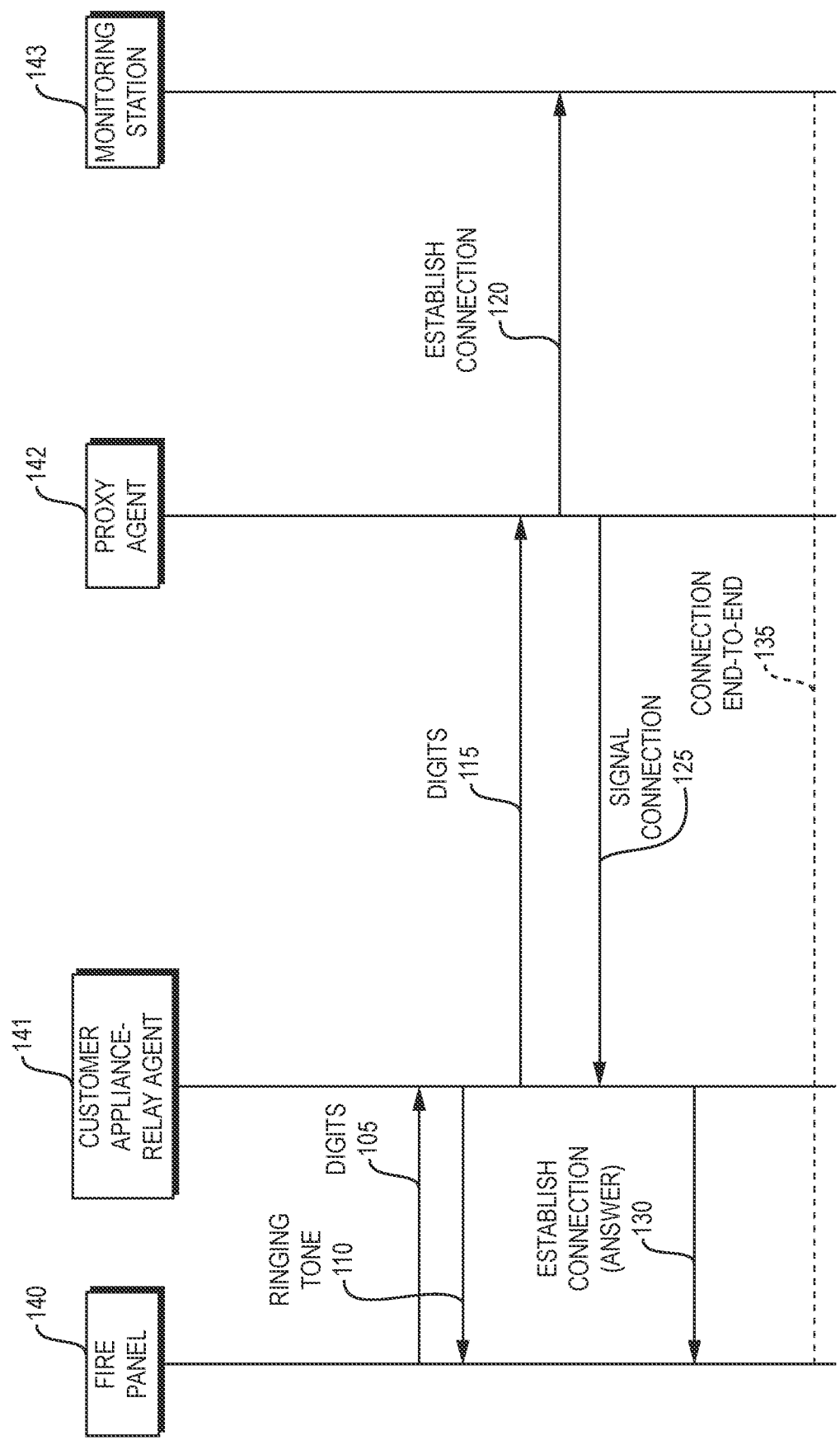
FIG. 1 is a signaling flow chart illustrating signals exchanged between different network elements when initiating an alarm call connection, according to an example embodiment.

A description of example embodiments follows.

As described above, some POTS-based services including, e.g., so-called "Life Safety" applications (fire and burglar/safety alarms, elevator phones, and entry systems, among other examples), are sensitive to latency. When such services are switched to a fiber- or LTE-based MFVN, these services may encounter latency issues during transmissions, via protocols such as IP, between (i) a customer appliance such as a MFVN device, which may support, e.g., a fire panel, and (ii) a remote/network controller and/or a remote device/appliance such a MFVN device, the latter of which may support, e.g., an alarm monitoring station.

Embodiments introduce an intelligent relay protocol to compensate for latency-sensitive applications such as alarm transmissions. The improved protocol, referred to herein as "alarm protocol relay" (APR), alleviates the challenges of latency and poor cell signal transmission using an algorithmic compensation methodology.

In an embodiment, a relay agent at the customer appliance and a proxy agent at, e.g., a remote/network controller or a remote device/appliance, work together to compensate for any latency introduced in challenging locations. The controller may be, e.g., a remote/network component implemented in either software or hardware, including, for example, as part of a session border controller (SBC) or other suitable network element known to those of skill in the art; the remote device/appliance may be, e.g., a MFVN device or other suitable known device. Such an inventive approach keeps the transmission real time and provides error correction and compensation to assure successful end-to-end transmission.

The relay agent and proxy agent may be implemented using computer software instructions. One or more processing devices at the customer appliance may be configured to execute the instructions for performing the operations and steps discussed herein for the relay agent, e.g., steps 701-705 of method 700 described hereinbelow in relation to FIG. 7. Likewise, for instance, processing device(s) at, or used to implement, a remote/network controller and/or at a remote device/appliance may be configured to execute the instructions for performing the operations and steps discussed herein for the proxy agent, e.g., the transmission monitoring, error identifying, and/or error correcting steps of method 700. The processing device(s) may be an application specific integrated circuit (ASIC), a field programmable gate array (FPGA), a digital signal processor (DSP), and/or a network processor, among other examples.

The APR protocol, according to an embodiment, includes two phases. In the first phase, shown in FIG. 1, an alarm call connection 135 is set up between a fire panel 140 and an alarm/fire monitoring station 143. In the second phase, shown in FIG. 2, the relay agent 141 (executing via, e.g., the customer appliance, such as a MFVN device) and proxy agent 142 (executing via or implemented by, e.g., a remote/network controller or remote device/appliance) work together to perform compensation for latency and retransmissions for communications between the fire panel 140 and the alarm/fire monitoring station 143 over the alarm call connection 135.

Referring now to FIG. 1, the first phase begins at 105, when the fire panel 140 dials the destination phone number of the monitoring station 143. The relay agent 141 running on the customer appliance collects the digits of the destination phone number from the fire panel 140 prior to answering. At 110, the customer appliance 141 provides a ringing tone to the fire panel 140. At 115, the relay agent 141 sends the collected digits to the proxy agent 142. In response to receiving the collected digits, the proxy agent 142 at 120 establishes a connection to the alarm/fire monitoring station 143. This functions to give a "head start" to the alarm connection.

Once the connection between the proxy agent 142 and the monitoring station 143 is established 120, the proxy agent 142 informs the relay agent 141 at 125 that this connection has been established. At 130, the relay agent 141 establishes a connection between the customer appliance 141 and the fire panel 140 by answering the alarm call placed by the fire panel 140, and a real-time, end-to-end connection between the fire panel 140 and the monitoring station 143 thereby results at 135.

By first establishing the connection 120 between the proxy agent 142 and the alarm/fire monitoring station 143 before providing answer signaling 130 to the fire panel 140 from the relay agent 141 at the customer appliance 141, referred to herein as a "head start" method, latency is reduced.

Figure 2:
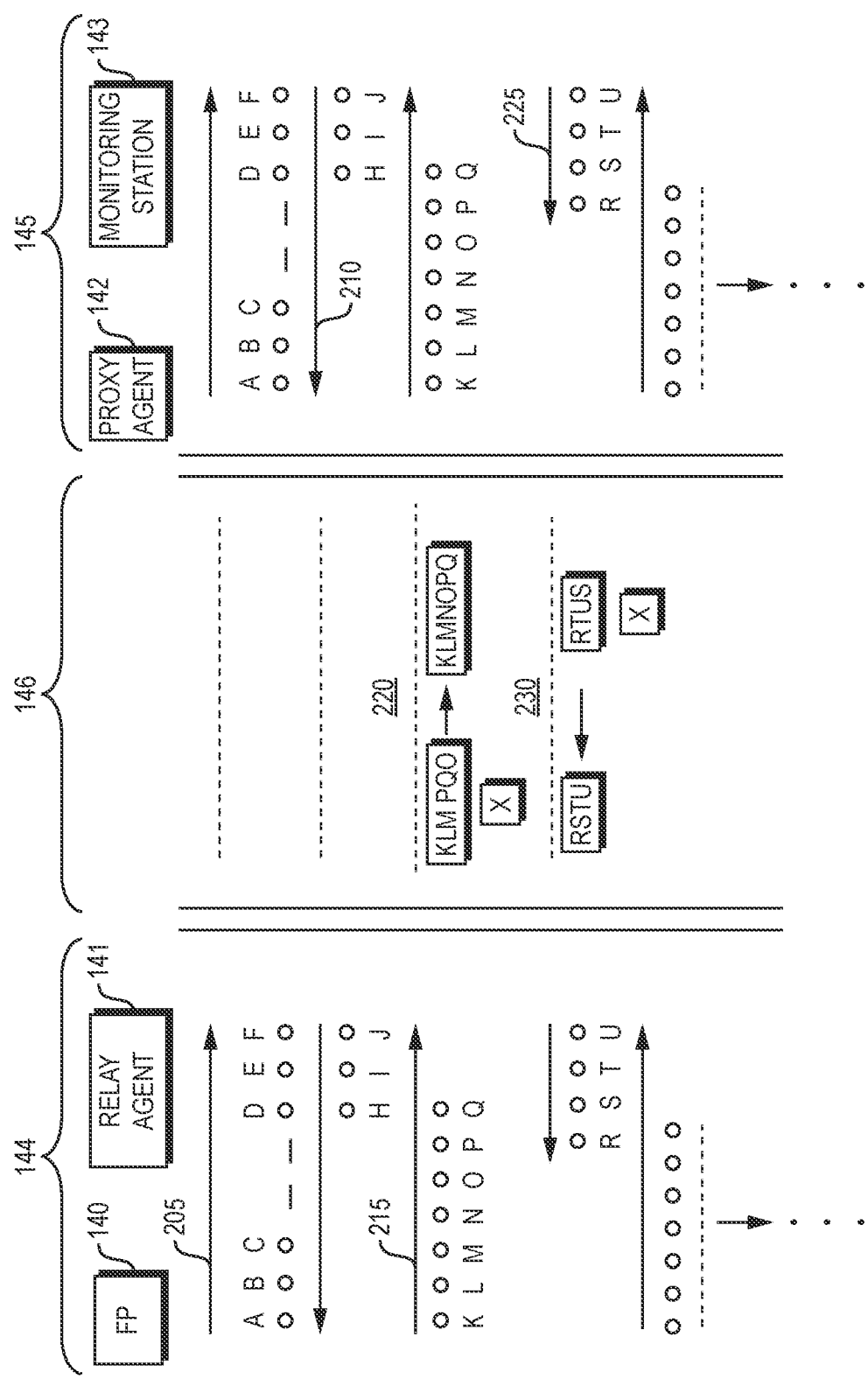
FIG. 2 is a conceptual diagram illustrating retransmission and latency compensation, according to an example embodiment.

Referring now to FIG. 2, the second phase, according to an embodiment is shown. In this second phase, communication between the fire panel (FP) 140 and the monitoring station 143 is monitored and the relay agent 141 and proxy agent 142 work together to compensate for latency and transmission errors. Left-hand region 144 shows communications between FP 140 and the relay agent 141 at the customer appliance. Right-hand region 145 shows communications between the proxy agent 142 (which may be, e.g., executing at/part of a remote/network controller or remote device/appliance) and monitoring station 143. Middle region 146 conceptually illustrates where error identification/detection and/or correction may occur for data/packets exchanged among FP 140 and monitoring station 143.

Continuing with the second APR phase depicted by FIG. 2, in a first transmission at 205, packets labeled A-B-C-D-E-F originating from the FP 140 are transmitted from the relay agent 141 to the proxy agent 142 intact. Likewise, in a second transmission at 210, packets labeled H-I-J originating from the monitoring station 143 are transmitted intact from the proxy agent 142 to the relay agent 141. In a third transmission at 215, packets labeled K-L-M-N-O-P-Q arrive at proxy agent 142 as "K-L-M-P-Q-O" and require correction at 220, by proxy agent 142, to insert missing packet "N" and be reordered for transmission to monitoring station 143. According to an embodiment, to facilitate error correction, e.g., at 220, when an original transmission such as 215 (e.g., packets K-L-M-N-O-P-Q) is initially received by relay agent 141 from the FP 140, relay agent 141 may delay sending the transmission to proxy agent 142 for a certain amount of time. During this delay period, relay agent 141 may analyze, e.g., the packets, their formatting, and/or their placement/ordering and generate a "ground truth" record of the transmission. Next, the ground truth analysis may be sent by relay agent 141 to proxy agent 142—in advance of the transmission 215. The relay agent 141 may then release the delayed transmission, e.g., 215, so that it can be sent to proxy agent 142. Finally, when the actual transmission is received by proxy agent 142 at 220, proxy agent 142 may, e.g., compare the actual transmission to the previously-received ground truth analysis to identify/detect error(s), and correct any error(s) that may be present. It is further noted that, for detecting and/or correcting error(s), proxy agent 142 may additionally or alternately employ system logic that corresponds to a given communication protocol according to which transmissions are made. For example, in an embodiment, proxy agent 142 may recognize, e.g., a Contact ID protocol or other known communication protocol, and may detect and/or correct error(s) based on requirements, e.g., header/data formats and/or tones/frequencies, etc., specified by the protocol. Further details of exemplary transmissions according to Contact ID and other known protocols are provided hereinbelow in relation to FIGS. 4A-B and 5.

Continuing with FIG. 2, in a fourth transmission at 225, packets labeled R-S-T-U arrive out of order as "R-T-U-S" and require correction at 230, by relay agent 141, to be reordered for transmission to FP 140. According to an embodiment, to facilitate error correction, e.g., at 230, when an original transmission such as 225 (e.g., packets R-S-T-U) is initially received by proxy agent 142 from the monitoring station 143, proxy agent 142 may delay sending the transmission to relay agent 141 for a certain amount of time. During this delay period, proxy agent 142 may analyze, e.g., the packets, their formatting, and/or their placement/ordering and generate a "ground truth" record of the transmission. Next, the ground truth analysis may be sent by proxy agent 142 to relay agent 141—in advance of the transmission 225. The proxy agent 142 may then release the delayed transmission, e.g., 225, so that it can be sent to relay agent 141. Finally, when the actual transmission is received by relay agent 141 at 230, relay agent 141 may, e.g., compare the actual transmission to the previously-received ground truth analysis to identify/detect error(s), and correct any error(s) that may be present. It is further noted that, for detecting and/or correcting error(s), relay agent 141 may additionally or alternately employ logic that corresponds to one or more communication protocols being used to transmit data. For example, in an embodiment, relay agent 141 may recognize, e.g., a Contact ID protocol or other known communication protocol, and may detect and/or correct error(s) based on requirements, e.g., header/data formats and/or tones/frequencies, etc., specified by the protocol. It should be noted that these transmissions 215 and 225 and corrections thereof 220, 230, are meant to show examples of packet insertion/repackaging/reordering/etc. performed by relay agent 141 and/or proxy agent 142 and can occur in other sequences. Likewise, other types of corrections may be implemented by embodiments.

Figure 3:
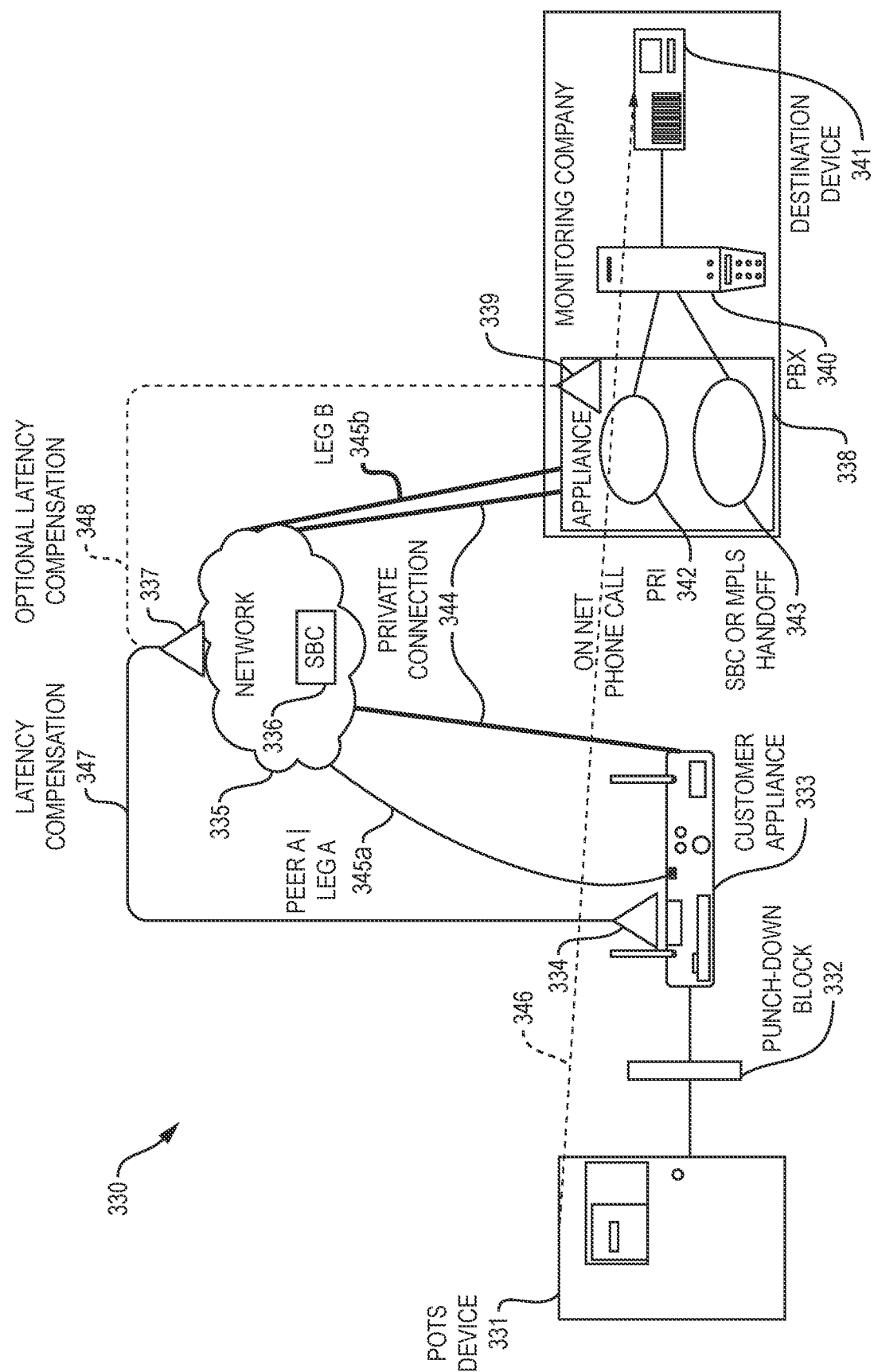
FIG. 3 is a simplified block diagram of a system for communication control, according to an example embodiment.

FIG. 3 is a simplified block diagram of a system 330 for communication control, according to an example embodiment. Specifically, system 330 includes POTS device 331, punch-down block 332, customer appliance 333, relay agent 334, network 335, SBC 336, second agent 337, remote appliance 338, third agent 339, private branch exchange (PBX) device 340, and destination device 341. Further, in system 330, customer appliance 333, e.g., a MFVN device, implements agent 334 where agent 334 may be configured to implement the functionality of relay agent 141 (FIG. 1). Likewise, a remote/network controller (not shown), e.g., in network 335 and/or as part of SBC 336, implements second agent 337 which may be configured to implement functionality of proxy agent 142 (FIG. 1), while remote appliance 338, e.g., a MFVN device, implements third agent 339 which may be configured to implement the functionality of proxy agent 142.

Multiple different configurations and/or permutations of relay agent 334, second agent 337, and third agent 339 are possible in system 330, according to embodiments. For example, in a first configuration, relay agent 334 may communicate (via, e.g., leg 345a of connection 344) with second agent 337, while remote appliance 338 and third agent 339 are not present. In a second example configuration, relay agent 334 may communicate (via, e.g., legs 345a and 345b of connection 344) with third agent 339 at remote appliance 338, while second agent 337 is not present. Further, in yet a third example configuration, relay agent 334 may communicate (via, e.g., leg 345a of connection 344) with second agent 337, and in turn second agent 337 may communicate (via., e.g., leg 345b of connection 344) with third agent 339.

In an implementation, POTS device 331 may be, e.g., a burglar/security/elevator/fire alarm, an emergency call box, an elevator phone, an access control/entry system, or any other suitable POTS device known to those of skill in the art.

According to an aspect, optional punch-down block 332 may be, e.g., a "66 block" (used to connect sets of wires in a telephone system), or any other suitable known punch-down block.

In an embodiment, customer appliance 333 and/or remote appliance 338 may be, e.g., a Granite EPIK™ device (Granite Telecommunications, LLC, Quincy, MA) or any other suitable device known to those of skill in the art. According to an aspect, customer appliance 333 and remote appliance 338 may be configured to implement relay agent 334 and third agent 339, respectively. In one such aspect, customer appliance 333 and/or remote appliance 338 may provide "Class-5" telephone switching functionality, such as tone generation and tone detection, among other examples. This functionality may be used by customer appliance 333 to implement relay agent 334 and/or method 700 (discussed in more detail hereinbelow in relation to FIG. 7). Details of an exemplary tone detection technique according to some embodiments are provided hereinbelow in relation to FIGS. 6A-D.

According to an example embodiment, customer appliance 333 may be a computer-based system for communication control. The customer appliance 333 may include a processor and a memory with computer code instructions stored thereon. In such an embodiment, the processor and the memory, with the computer code instructions, are configured to cause customer appliance 333 to implement any embodiments or combination of embodiments described herein. According to an aspect, functionality implemented by the processor and memory may include tone generation and/or detection function(s) described herein.

Further, in yet another example embodiment, customer appliance 333 may include a non-transitory computer program product for communication control. The computer program product may include a computer-readable medium with computer code instructions stored thereon. According to such an embodiment, the computer code instructions are configured, when executed by a processor, to cause an apparatus associated with the processor to implement any embodiments or combination of embodiments described herein. According to an aspect, functionality implemented by the computer-readable medium, computer code instructions, and processor may include tone generation and/or detection function(s) described herein.

In an implementation, network 335 may include network elements such as SBC 336, which may be used to protect Session Initiation Protocol (SIP)-based voice over Internet Protocol (VoIP) networks, among other examples. Further, according to an embodiment, network 335 may offer, e.g., time-division multiplexing (TDM) functionality, and may support one or more known communications protocols.

Similar to customer appliance 333, in an aspect, the remote/network controller (not shown) and remote appliance 338 may be configured to implement second agent 337 and third agent 339, respectively.

Further, according to an implementation, if present, optional remote appliance 338 may support, e.g., Primary Rate Interface (PRI) 342, SBC/Multiprotocol Label Switching (MPLS) 343, and/or other known connection(s), to destination device 341, or, if present, to optional PBX 340. The optional remote appliance 338 may further be configured to communicate with network 335 and/or SBC 336, as well as other known network elements. If optional remote appliance 338 is not present and optional PBX 340 is present, then PBX 340 may connect, e.g., via PRI 342 to a (not shown) public switched telephone network (PSTN) and/or via SIP to a data center (not shown) such as may be part of network 335.

In an embodiment, optional device 340 may be, e.g., a PBX or other suitable known telephone system, and may interface with optional remote appliance 338, if present, via, e.g., PRI 342 and/or a SBC/MPLS handoff 343. If present, optional PBX 340 may be configured to provide functionality such as analog-to-digital conversion for destination device 341. Further, in an aspect, optional remote appliance 338, optional PBX 340, and/or destination device 341 may be equipment that is owned/maintained by, e.g., a fire monitoring company.

In an embodiment, a network connection 344, such as a private network connection, among other examples, may be established between customer appliance 333 and remote appliance 338 via network 335. The connection 344 may include, for example, a first portion 345a from customer appliance 333 to network 335, and a second portion 345b from network 335 to remote appliance 338. In an embodiment, network connection 344 may be, e.g., a wired connection, a cellular/LTE or other known wireless connection, a LAN (local area network) or WAN (wide area network) connection, or any other suitable network connection known to those of skill in the art. Similarly, in an aspect, by utilizing network connection 344, telephone connection 346 may be established between POTS device 331 and destination device 341. Further, according to an embodiment, latency compensation 347 (implemented via, e.g., relay agent 334 and/or second agent 337) and/or optional latency compensation 348 (implemented via, e.g., second agent 337 and/or third agent 339) may be applied to telephone call 346.

In an implementation, device 341 may be, e.g., an alarm monitoring station or other suitable known device.

Hereinbelow, in relation to method 700 of FIG. 7, a description of system 330 implementing example embodiments of APR phase 1 (FIG. 1) and phase 2 (FIG. 2) is provided.

Figure 4A:
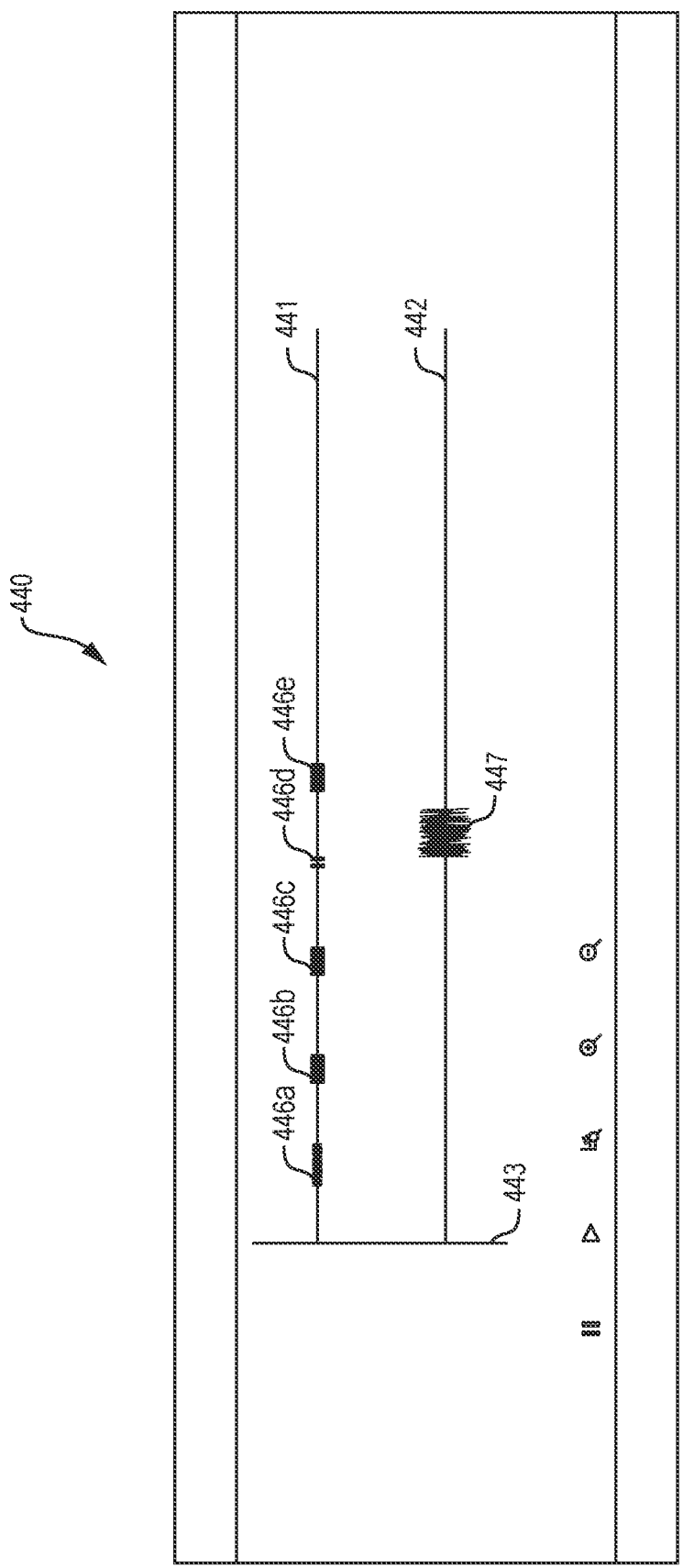
FIGS. 4A-B are images of a recording of a telephone call between a first device and a second device subject to control by an example embodiment.
Figure 4B:
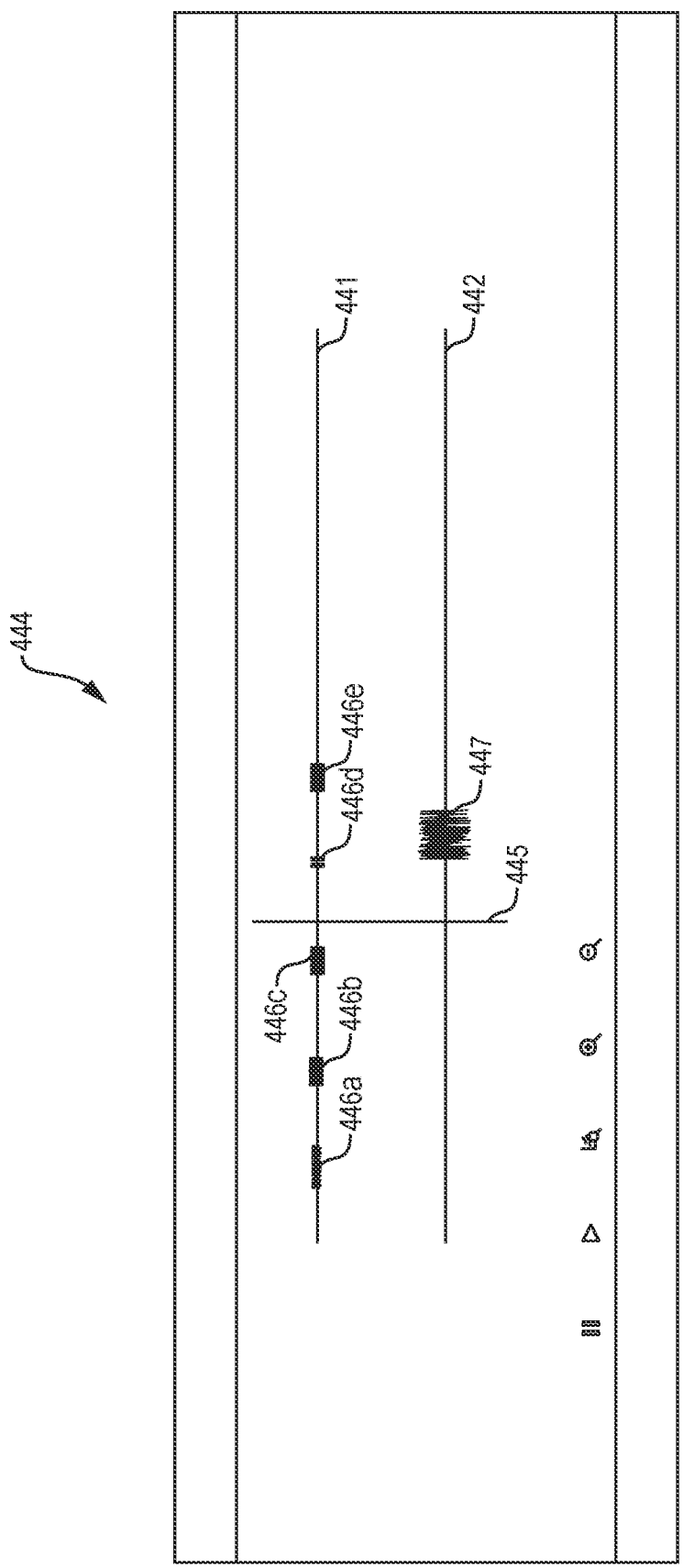

FIGS. 4A and 4B are images 440 and 444, respectively, of a recording of a telephone call between a first device 441 and a second device 442 where the telephone call may be controlled according to an example embodiment. In an aspect, images 440 and 444 may be displayed by an "analyzer" component or tool associated with the APR protocol. The first device 441 may be, e.g., fire panel 140 (FIG. 1) or POTS device 331 (FIG. 3). Likewise, second device 442 may be, e.g., alarm monitoring station 143 (FIG. 1) or destination device 341 (FIG. 3). As shown in FIGS. 4A and 4B, first device 441 sends transmissions 446a-e to second device 442. Likewise, second device 442 sends transmission 447 to first device 441. FIG. 4A shows the recording at time 443, while FIG. 4B shows the same recording at time 445. According to an implementation, transmissions 446a-e and/or 447 may undergo frequency analysis by the analyzer component as described in more detail hereinbelow in relation to FIGS. 6A-D.

In an embodiment, transmissions 446a-e and/or 447 may be transmitted via, e.g., end-to-end connection 135 (FIG. 1) or telephone connection 346 (FIG. 3). Further, according to an aspect, transmissions 446a-e and 447 may correspond to, e.g., transmissions 205/215 and transmissions 210/225, respectively, of FIG. 2. Details of monitoring transmissions 446a-e and/or 447, and identifying and/or correcting error(s) in the transmissions are provided hereinbelow in relation to method 700 of FIG. 7.

FIG. 5 is a user interface 550 displaying a set of tones 559a-l sent and/or received as part of a telephone call that may be controlled according to an example embodiment. According to an implementation, interface 550 may be displayed by an analyzer component associated with the APR protocol. Further, in an embodiment, tones 559a-l may be identified or detected based on a frequency analysis technique employed by the analyzer component and described in more detail hereinbelow in relation to FIGS. 6A-D. In an aspect, the telephone call displayed by user interface 550 may occur between, e.g., fire panel 140 (FIG. 1), POTS device 331 (FIG. 3), or first device 441 (FIG. 4A) and alarm monitoring station 143 (FIG. 1), destination device 341 (FIG. 3), or second device 442 (FIG. 4A). Further, in an embodiment, the telephone call may take place via, e.g., end-to-end connection 135 (FIG. 1) or telephone connection 346 (FIG. 3). As shown in FIG. 5, user interface 550 displays tones 559a-l for a communications protocol type 551. In an implementation, communications protocol type 551 is a "Contact ID" protocol. However, embodiments of the present disclosure are not limited to a particular type of communications protocol; instead, any suitable communications protocol known in the art may be used.

Continuing with FIG. 5, for each of tones 559a-l, user interface 550 displays a tone type 552, tone frequency 553, start time 554 in milliseconds (ms), end time 555 in ms, length 556 in ms, squelch threshold 557, and squelch response 558 in ms. For example, in an embodiment, tone 559a may have a type 552 of "Signal," a frequency 553 of 1400 (which may be in, e.g., hertz (Hz)), a start time 554 of 9994 ms, an end time 555 of 10994 ms, a length 556 of 1000 ms (e.g., based on subtracting start time 9994 ms from end time 10994 ms), a squelch threshold 557 of 0.0125, and a squelch response 558 of 2 ms.

In an aspect, squelch threshold 557 may be a threshold value or factor employed when using a known technique (e.g., a Fourier transform) to identify audio signals or tones, e.g., tones 559a-l, from a stream of digital values. Further, in an implementation, threshold 557 may be determined by, for example, initializing its value to 0.1, and then repeatedly dividing the value by 2.0 until either a signal/tone is identified or a limit, such as 0.0001, is reached. According to an embodiment, threshold 557 may also differ according to, or be specified by, a protocol being used, such as Contact ID or FSK, among other examples.

As another example, in an aspect, tone 559c may have a type 552 of "DTMF" (dual-tone multi-frequency signaling used for push-button telephones), a frequency 553 of "DTMF2" (e.g., corresponding to a telephone '2' key, which frequency may be a combination of a 697 Hz "low" tone and a 1336 Hz "high" tone), a start time 554 of 14360 ms, an end time 555 of 14420 ms, a length 550 of 60 ms, a squelch threshold 557 of 0.025, and a squelch response 558 of 20 ms.

Referring again to FIG. 5, in an implementation, a tone type 552 of "Signal" may indicate a tone sent for purposes of signaling and/or handshaking between two devices according to a given communications protocol, e.g., Contact ID, while a tone type 552 other than "Signal" (such as "DTMF") may indicate a data transmission sent following completion of signaling and/or handshaking. Thus, in an embodiment, according to the Contact ID protocol, handshaking may be conducted by first sending a single (or "pure") tone of 1400 Hz (e.g., tone 559a), followed by a single tone of 2300 Hz (e.g., tone 559b). In an aspect, after handshaking is complete, any number of data transmissions may be sent, e.g., tones 559c-l. Further, according to an implementation, a final data transmission, e.g., tone 559l, may correspond to a "checksum" digit or packet that enables a device to perform integrity verification for a received message. In an embodiment, following successful receipt, a device may send a single tone (not shown) of 1400 Hz as a "kiss-off" signal indicating that communications have ended. According to an aspect, if a transmitting device does not receive a kiss-off signal within, e.g., a present amount of time, it may perform one or more retransmissions of a message.

In an embodiment, tones 559c-l may correspond to, e.g., packet/data transmissions 205/215 and/or 210/225 (FIG. 2). Details of monitoring packets 559c-l and identifying and/or correcting error(s) in the packets are provided hereinbelow in relation to method 700 of FIG. 7.

FIGS. 6A, 6B, 6C, and 6D are graphs 600, 610, 620, and 630, respectively, of frequency analyses according to an example embodiment. According to an aspect, graphs 600, 610, 620, and 630 may be displayed by the analyzer component associated with the APR protocol. In an implementation, the analyzer may use a known technique, such as Fourier transform, to identify audio signals or tones by searching through a data stream, e.g., a stream of digital values, while adjusting a threshold factor and a sampling window size. According to an embodiment, the threshold factor may be determined according to the technique described hereinabove in relation to squelch threshold 557 of FIG. 5. In an aspect, window size may be determined by, for example, initializing its value to a suitably high number, and then repeatedly dividing the value by 2.0 until either a signal/tone is identified or a limit, such as 128, is reached. Further, in an implementation, the sample count for a given window size may be calculated by, e.g., dividing the window size by 1,000 and then multiplying by an audio sample rate.

Figure 6A:
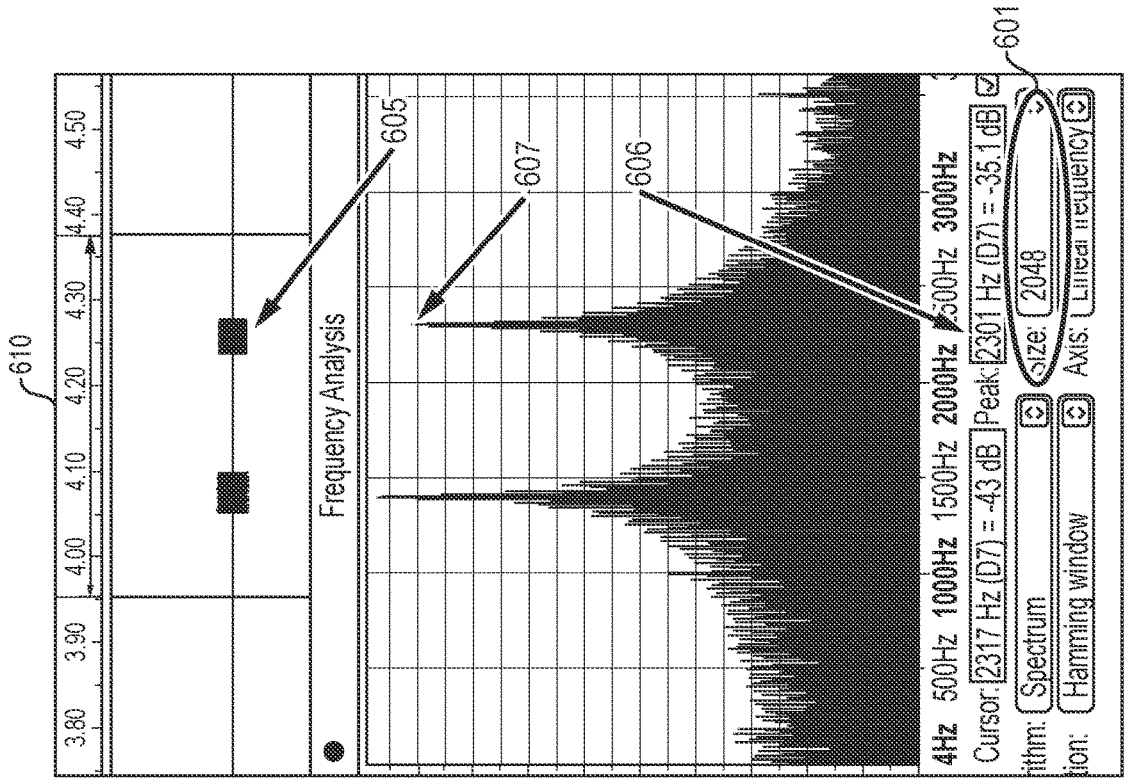
FIGS. 6A-D are graphs of frequency analyses according to an example embodiment.

As shown in FIG. 6A, graph 600 reflects a window size 601 of 2048. Further, graph 600 indicates that data packet 602 includes a peak 603 of approximately 1400 Hz (corresponding to −31.0 dB [decibel]); peak 603 is also displayed visually 604.

Figure 6B:
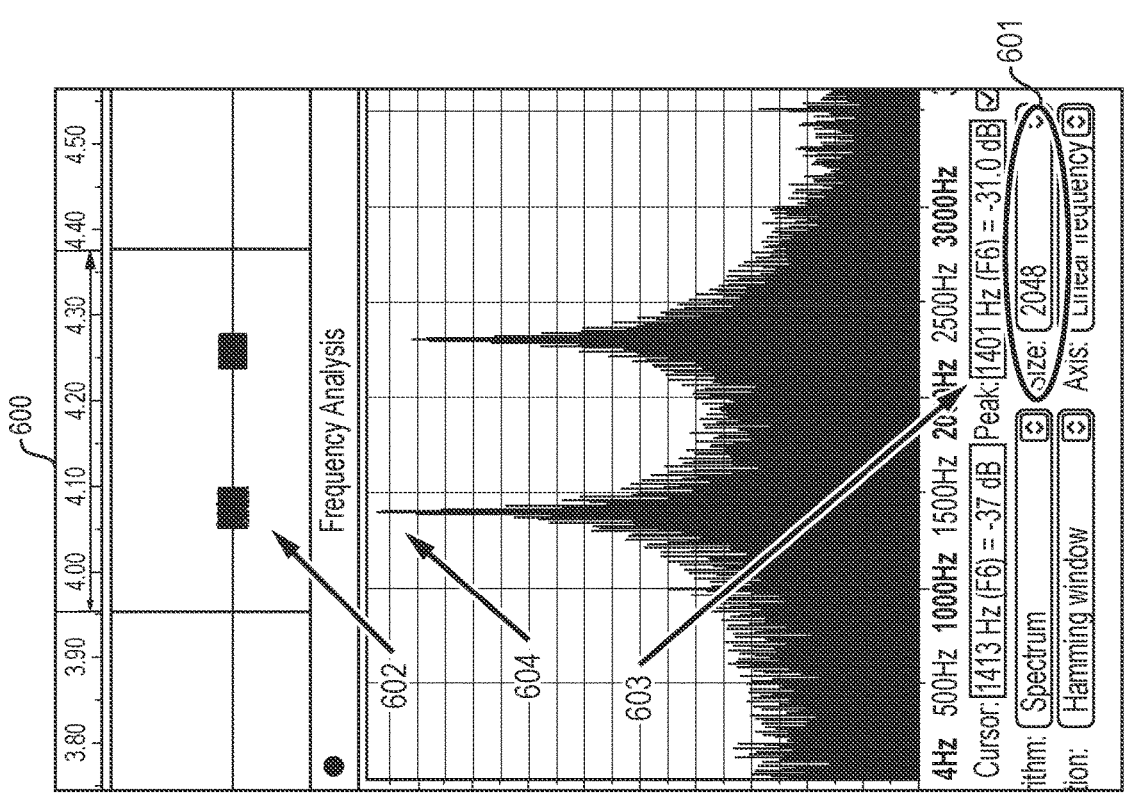

As shown in FIG. 6B, graph 610, like graph 600, reflects window size 601 of 2048. Further, graph 610 indicates that data packet 605 includes a peak 606 of approximately 2300 Hz (corresponding to −35.1 dB); peak 606 is also displayed visually 607.

Figure 6D:
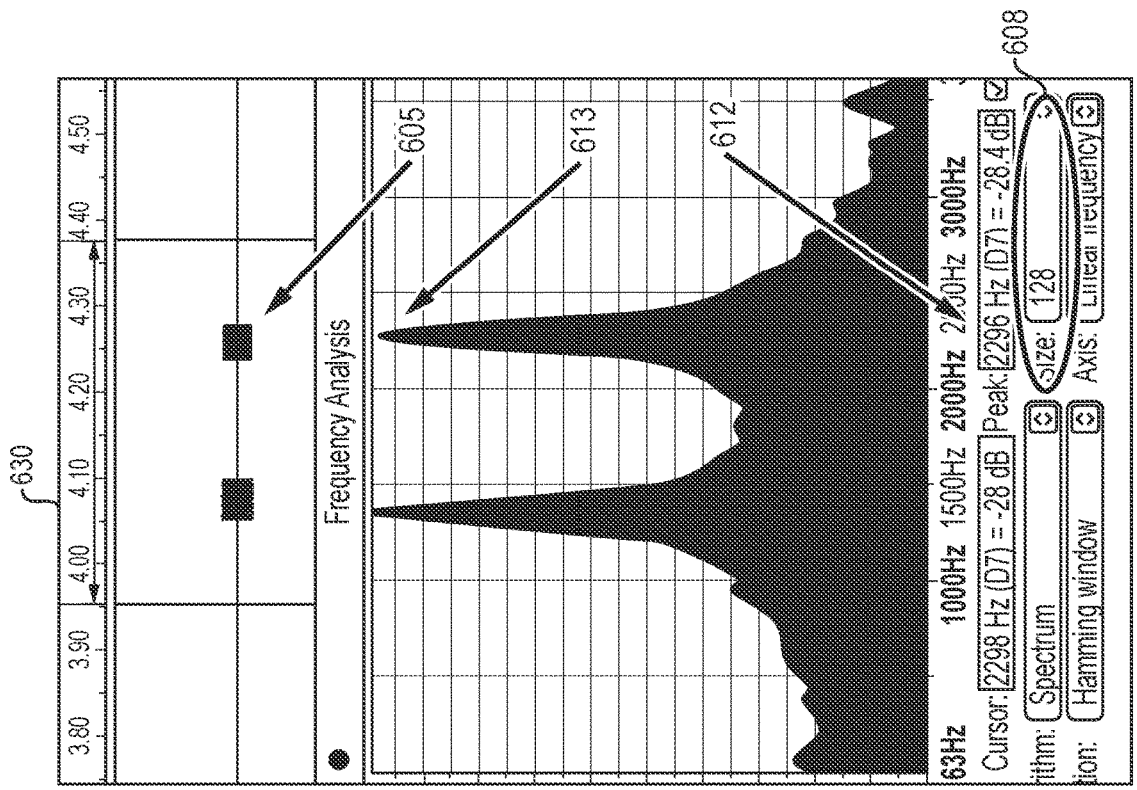
Figure 6C:
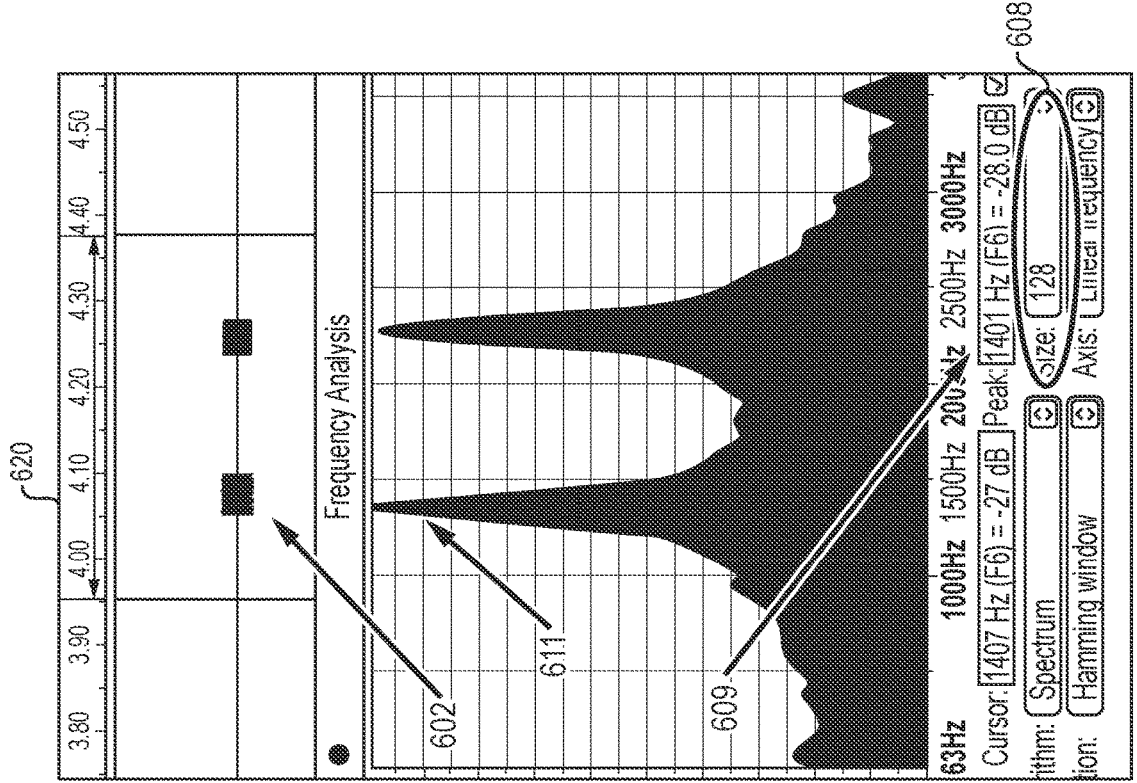

As shown in FIG. 6C, graph 620 reflects a window size 608 of 128. Further, graph 620 indicates that data packet 602 includes a peak 609 of approximately 1400 Hz (corresponding to −28.0 dB); peak 609 is also displayed visually 611.

As shown in FIG. 6D, graph 630, like graph 620, has a window size 608 of 128. Further, graph 630 indicates that data packet 605 includes a peak 612 of approximately 2300 Hz (corresponding to −28.4 dB); peak 612 is also displayed visually 613.

Figure 7:
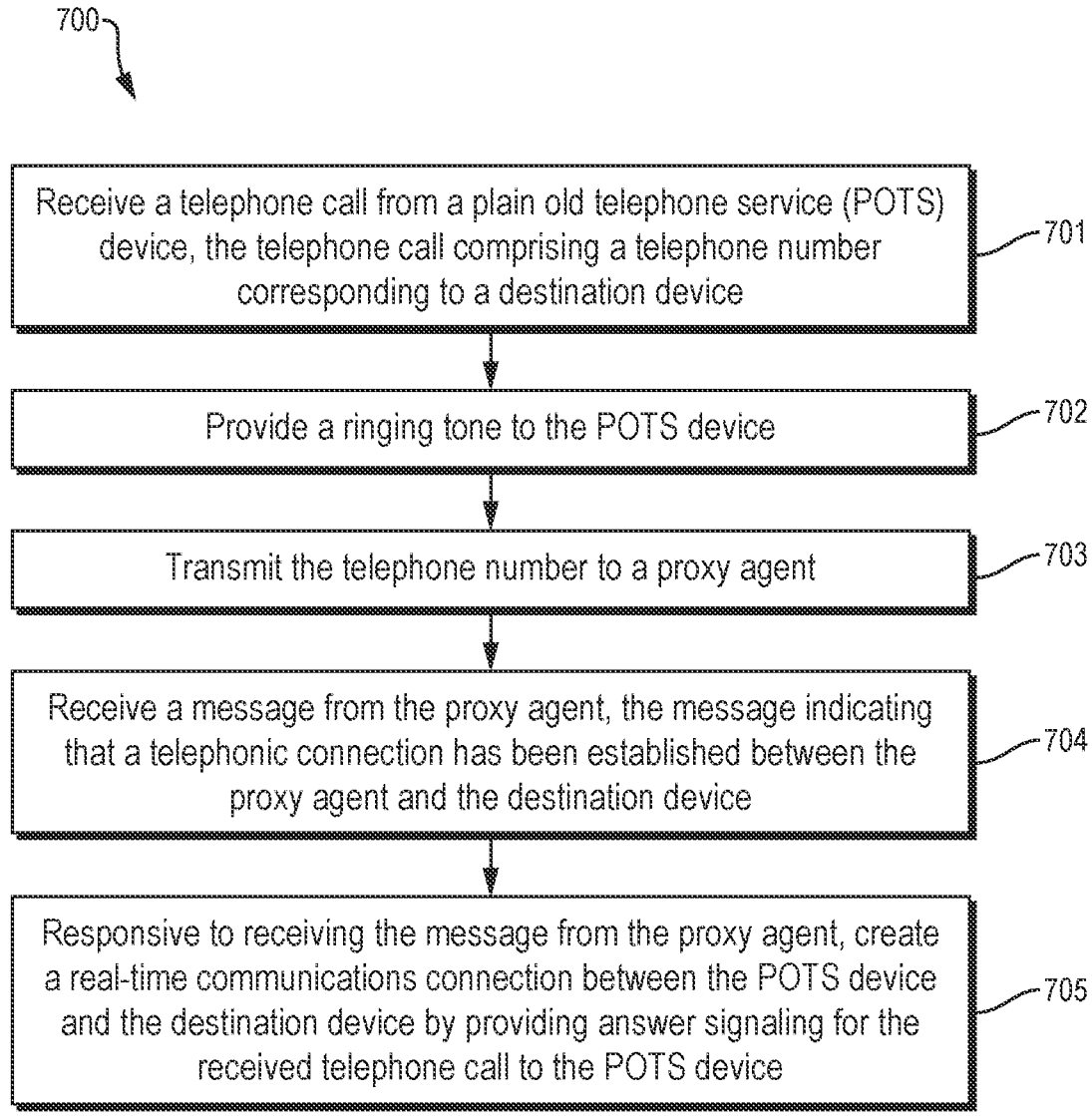
FIG. 7 is a flow diagram of a method for communication control, according to an example embodiment.

FIG. 7 is a flow diagram of a method 700 for communication control, according to an embodiment. The method 700 may be implemented by a relay agent, e.g., relay agent/customer appliance 141 (FIG. 1) or relay agent 334 operating at customer appliance 333 (FIG. 3). In an aspect, some or all portions of method 700 may be performed as part of implementing functionality of Session layer 805 and/or Presentation layer 806 of OSI model 800, discussed in more detail hereinbelow in relation to FIG. 8.

The method 700 starts at step 701 by receiving a telephone call from a POTS device, e.g., POTS device 140 (FIG. 1) or 331 (FIG. 3). The telephone call includes a telephone number corresponding to a destination device, e.g., device 143 (FIG. 1) or 341 (FIG. 3).

Next, at step 702, method 700 provides a ringing tone (also referred to as a ringback tone or audible ringing) to the POTS device. For example, in an implementation, when routing of a call is successful and a destination device is not already busy, the recipient may be alerted to the incoming call. During this period of alerting, the caller may also receive a distinctive signal, e.g., a ringing tone or ringback tone.

The method 700 then, at step 703, transmits, e.g., via network connection 344 and network 335 (FIG. 3) or network 70 (FIG. 9), the telephone number to a proxy agent, e.g., proxy agent/controller 142 (FIG. 1).

At step 704, method 700 receives, e.g., via network connection 344 and network 335 or 70, a message from the proxy agent. The message indicates that a telephonic connection has been established between the proxy agent (e.g., 142) and the destination device (e.g., 143 or 341).

Last, at step 705, responsive to receiving the message from the proxy agent, method 700 creates a real-time communications connection, e.g., telephone connection 346 (FIG. 3), between the POTS device and the destination device by providing answer signaling for the received telephone call to the POTS device.

In an aspect, method 700 may further include monitoring transmissions, e.g., transmissions 205, 210, 215, or 225 (FIG. 2), 446a-e or 447 (FIG. 4A), or 559a-l (FIG. 5), on the real-time communications connection between the POTS device and the destination device. Responsive to the monitoring, method 700 may also identify one or more errors, e.g., errors 220 or 230 (FIG. 2), in a given transmission.

According to an implementation, the one or more errors may be identified based on a discrepancy between a communications protocol and the given transmission. In an embodiment, method 700 may further correct the one or more errors by modifying the given transmission to be in accordance with the communications protocol. For example, in an aspect, the communications protocol may be a fire alarm and signaling code, e.g., NFPA 72®. According to NFPA 72®, a MFVN may be defined as a physical facilities-based network capable of transmitting real-time signals with formats unchanged that is managed, operated, and maintained by a service provider to ensure service quality and reliability from a subscriber location to PSTN interconnection points or other MFVN peer networks. In an implementation, to comply with the requirement that real-time signals have their "formats unchanged," method 700 may modify the given transmission so that its original format—e.g., prior to the one or more errors occurring—is not changed due to an influence of the one or more errors. According to some embodiments, because an original format of the given transmission, e.g., 205, 210, 215, or 225 (FIG. 2), 446a-e or 447 (FIG. 4A), or 559a-l (FIG. 5), is known by e.g., relay agent 334, second agent 337, and/or third agent 339 (FIG. 3), such knowledge may be used to identify or recognize the discrepancy with the communications protocol and modify the given transmission to return it to the original format, e.g., as shown by recording images 440 (FIG. 4A) or 444 (FIG. 4B), by eliminating or removing the influence of the one or more errors.

Similarly, in an aspect, relay agent 334, second agent 337, and/or third agent 339 may understand requirements/mechanics for the communications protocol, e.g., NFPA 72®, and may be aware of what signal and/or packet sequences are expected while a transmission is taking place according to the protocol. Thus, in an embodiment, if relay agent 334, second agent 337, and/or third agent 339 detects that, e.g., packets are not in a proper order and do not meet logic and/or algorithm requirement(s) for the protocol, relay agent 334, second agent 337, and/or third agent 339 may intercede and rearrange or reorder the packets to comply with the requirement(s).

As yet another example, in an embodiment, and with reference to FIG. 5, if method 700 detects that a first tone frequency, e.g., frequency 553 of tone 559a, is not 1400 Hz or is missing, then method 700 may perform automatic error correction, such as by modifying of tone 559a to be 1400 Hz or by inserting a tone with a frequency of 1400 Hz in an appropriate location. In an embodiment, method 700 may be aware of required frequencies, and their correct sequence and timing, for a given communications protocol.

Continuing with FIG. 7, according to an aspect, the one or more errors may include a missing packet, e.g., error 220 (FIG. 2), an out-of-order packet, e.g., error 220 or 230 (FIG. 2), or a mistimed packet. Further, it is noted that embodiments of method 700 are not limited to correcting the aforementioned errors and embodiments may correct any errors that occur.

In an implementation, method 700 may further include correcting the one or more errors in the given transmission. According to an embodiment, method 700 may correct the one or more errors in the given transmission by inserting one or more packets into the given transmission, reordering one or more packets of the given transmission, or modifying a tone frequency of one or more packets of the given transmission. Further, it is noted that embodiments of method 700 are not limited to performing the aforementioned corrective actions and embodiments may implement any desired corrective actions known to those of skill in the art.

According to an aspect, method 700 may further include creating a secure tunnel by encrypting the real-time communications connection. In an embodiment, the secure tunnel may be facilitated by employing a lightweight VPN (virtual private network) tunneling mechanism. Further, in an implementation, utilizing the secure tunnel may provide benefits such as enabling compliance with an organization's or entity's security and/or firewall requirements. According to an aspect, because the secure tunnel enables end-to-end encryption of communications, the communications may be protected from, e.g., hacking and "phreaking" attacks. In contrast, existing approaches provide only partial or incomplete security and, thus, are vulnerable to communications being comprised, such as by call eavesdropping or snooping when security measures terminate at a PSTN.

Figure 8:
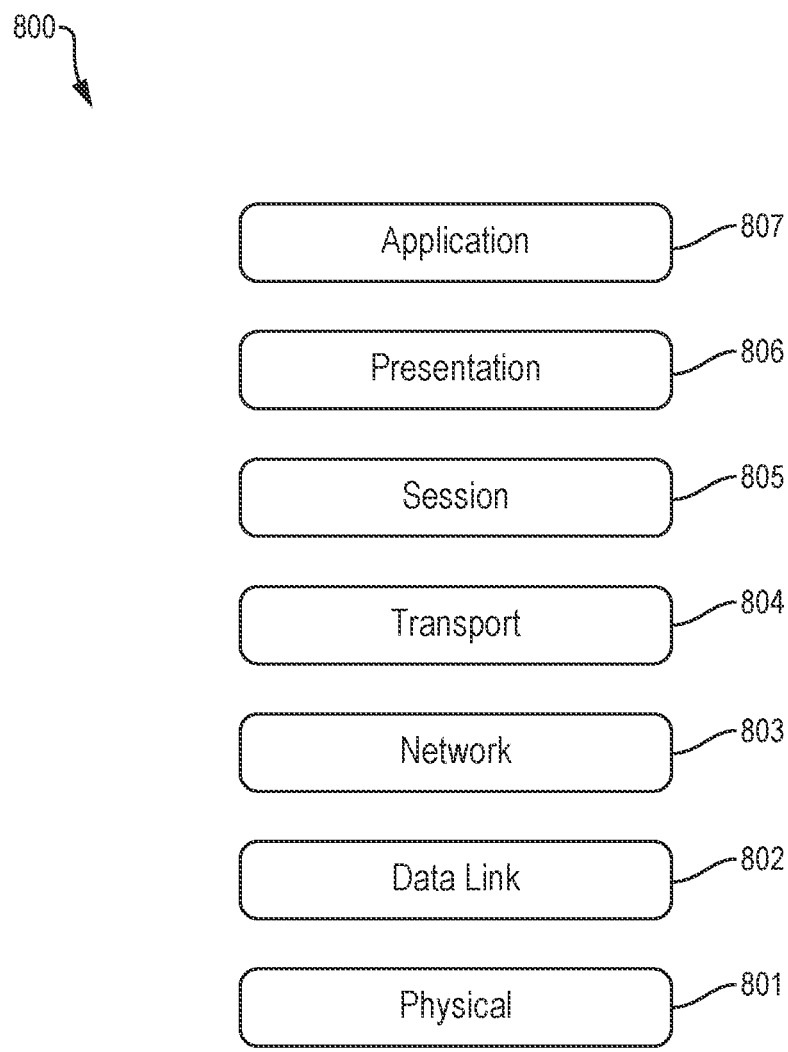
FIG. 8 is a block diagram illustrating an Open Systems Interconnection (OSI) model, according to an example embodiment.

FIG. 8 is a block diagram illustrating an OSI model 800, according to an example embodiment. In an aspect, model 800 may be a conceptual model that provides a common basis for coordination of standards development for purpose of systems interconnection. As shown in FIG. 8, in model 800, communications between systems may be split into seven different abstraction layers: Physical 801, Data Link 802, Network 803, Transport 804, Session 805, Presentation 806, and Application 807.

Continuing with FIG. 8, in an implementation, model 800 may partition dataflows in a communication system into the seven abstraction layers 801-807 to describe networked communication from, e.g., physical implementation of transmitting bits across a communications medium to a highest-level representation of data of a distributed application. Each intermediate layer may serve a class of functionality to a layer above it and may be served by a layer below it.

Referring again to FIG. 8, in an embodiment, each layer in model 800 may have well-defined functions, and functions of each layer may communicate and interact with those of layers immediately above and below as appropriate. For example, in an aspect, Physical layer 801 may include functions such as transmission and reception of raw bit streams over a physical medium. Data Link layer 802 may include functions such as transmission of data frames between two nodes connected by Physical layer 801. Network layer 803 may include functions such as structuring and managing a multi-node network, including functions such as addressing, routing and traffic control, among other examples. Transport layer 804 may include functions such as reliable transmission of data segments between points on a network, including functions such as segmentation, acknowledgement, and multiplexing, among other examples. Session layer 805 may include functions such as managing communication sessions, e.g., continuous exchange of information such as via multiple back-and-forth transmissions between two nodes. Presentation layer 806 may include functions such as translation of data between a networking service and an application, including character encoding, data compression, and encryption/decryption, among other examples. Application layer 807 may include functionality for high-level protocols, such as resource sharing or remote file access, via e.g., HTTP, and other protocols known to those of skill in the art.

In some embodiments, relay agent 141 (FIG. 1) or 334 (FIG. 3), second agent 142 (FIG. 1) or 337 (FIG. 3), and/or third agent 339 (FIG. 3) may provide functionality, such as repacking/reordering packets, inserting missing packets, latency compensation 347, optional latency compensation 348, etc., among other examples, that corresponds to Session layer 805 and/or Presentation layer 806 of OSI model 800.

Figure 9:
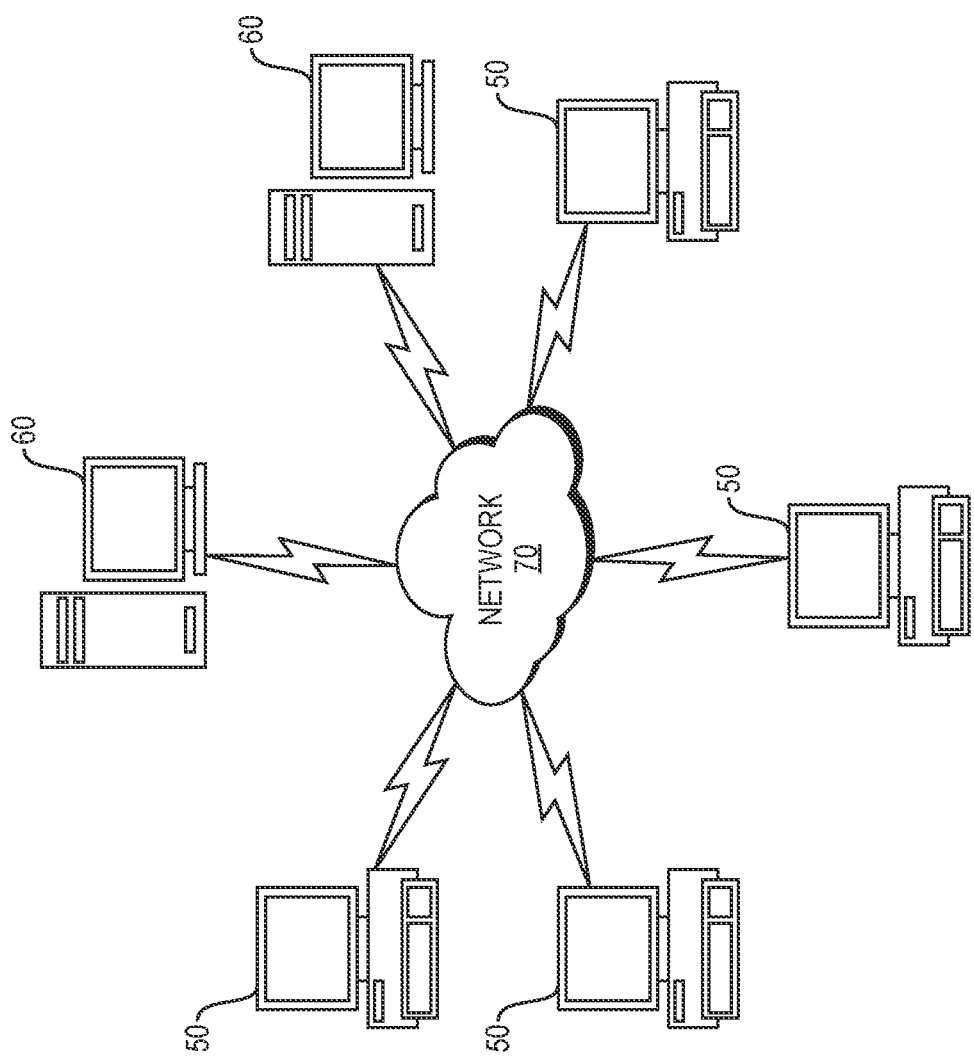
FIG. 9 illustrates a computer network or similar digital processing environment in which embodiments may be implemented.

FIG. 9 illustrates a computer network or similar digital processing environment in which embodiments of the present disclosure may be implemented.

Client computer(s)/device(s) 50 and server computer(s) 60 provide processing, storage, and input/output devices executing application programs and the like. The client computer(s)/devices 50 can also be linked through communications network 70 to other computing devices, including other client computer(s)/device(s) 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computer(s)/device(s) 50 and/or server computer(s) 60 may be configured, alone or in combination, to implement the embodiments described herein, e.g., the method 700, among other examples. The server computer(s) 60 may not be separate server computers but part of communications network 70.

Figure 10:
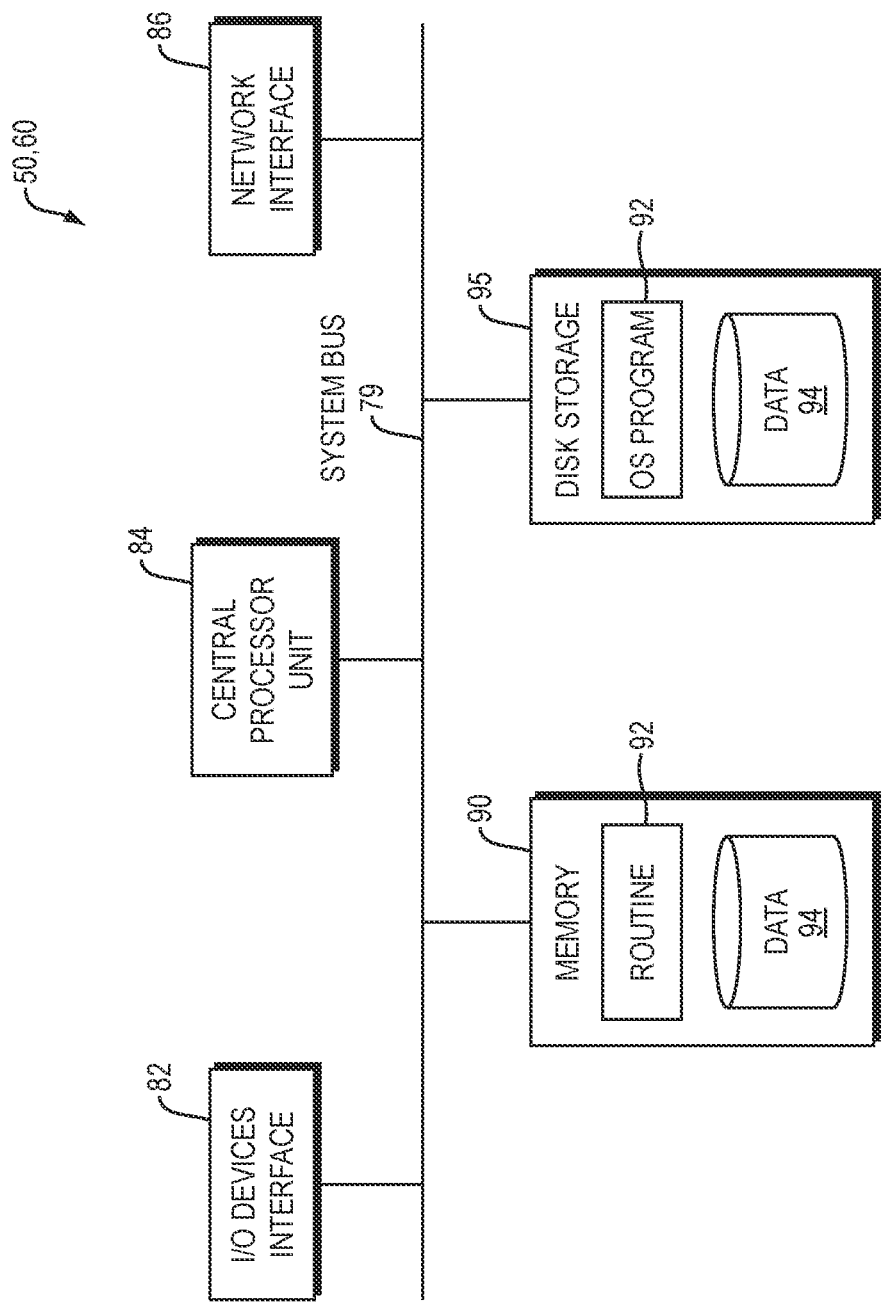
FIG. 10 is a diagram illustrating an example internal structure of a computer in the environment of FIG. 9.

FIG. 10 is a diagram of an example internal structure of a computer (e.g., client computer(s)/device(s) 50 or server computer(s) 60) in the computer system of FIG. 9. Each computer/device 50 and server computer 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output (I/O) ports, network ports, etc.) and enables the transfer of information between the elements. Attached to the system bus 79 is an I/O device interface 82 for connecting various input and output devices (e.g., keyboard, mouse, displays, printers, speakers, etc.) to the computer/device 50 or server computer 60. A network interface 86 allows the computer/device 50 or server computer 60 to connect to various other devices attached to a network (e.g., communications network 70 of FIG. 9). Memory 90 provides volatile storage for computer software instructions 92 and data 94 used to implement an embodiment of the present disclosure (e.g., the method 700, among others). Disk storage 95 provides non-volatile storage for computer software instructions 92 and data 94 used to implement an embodiment of the present disclosure. A central processor unit 84 is also attached to the system bus 79 and provides for the execution of computer instructions.

U.S. Pat. No. 10,986,555, with inventor Moshayedi, titled "Analog And Digital Communication System For Interfacing Plain Old Telephone Service Devices With A Network" (hereinafter "the '555 Patent"), is incorporated by reference in its entirety. The '555 Patent discloses an analog and digital communication system which establishes a connection between a POTS device and a destination device. According to an embodiment of the '555 Patent, the system includes a customer appliance that includes multiple ports, an internal power source device, a subscriber identification module (SIM) card, an electronic control unit, an analog to digital converter, and a processor device. In operation, at least one of the ports is operably connected to the POTS device. A controller communicates remotely with the customer appliance via a network to provide routing of a telephone call between the POTS device and the destination device. The controller is configured to at least one of transmit the telephone call or receive the telephone call via a closest PSTN handoff or via an internal customer appliance network establishing a connection between the customer appliance and a second customer appliance. Embodiments described herein, e.g., method 700, may be implemented, in whole or in part, using embodiments described in the '555 Patent.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for communication control, the computer-implemented method comprising, by a relay agent:
　receiving a telephone call from a plain old telephone service (POTS) device, the telephone call comprising a telephone number corresponding to a destination device;
　responsive to receiving the telephone call and prior to providing answer signaling for the received telephone call to the POTS device, establishing a telephonic head-start connection between a proxy agent and the destination device, establishing the telephonic head-start connection including:
　　providing a ringing tone to the POTS device, the ringing tone indicating that (i) an attempt to connect the telephone call is being made and (ii) an attempt to establish the telephonic head-start connection between the proxy agent and the destination device is being made;
　　establishing a private network connection between the relay agent and the proxy agent;
　　transmitting, via the established private network connection, the telephone number to the proxy agent; and
　　receiving, via the established private network connection, a message from the proxy agent, the message indicating that the telephonic head-start connection has been established between the proxy agent and the destination device;
　responsive to establishing the telephonic head-start connection, utilizing the established private network connection to create a real-time telephonic connection between the POTS device and the destination device by providing the answer signaling for the received telephone call to the POTS device;
　monitoring transmissions on the real-time telephonic connection between the POTS device and the destination device to identify one or more errors in a given transmission; and
　correcting the one or more errors in the given transmission.

2. The computer-implemented method of claim 1, wherein the one or more errors are identified based on a discrepancy between a communications protocol and the given transmission.

3. The computer-implemented method of claim 2, wherein:
correcting the one or more errors includes modifying the given transmission to be in accordance with the communications protocol.

4. The computer-implemented method of claim 1, wherein the one or more errors include at least one of: a missing packet, an out-of-order packet, and a mistimed packet.

5. The computer-implemented method of claim 1, wherein correcting the one or more errors in the given transmission includes at least one of: (i) inserting one or more packets into the given transmission, (ii) reordering one or more packets of the given transmission, and (iii) modifying a tone frequency of one or more packets of the given transmission.

6. The computer-implemented method of claim 1, further comprising:
creating a secure tunnel by encrypting the real-time telephonic connection.

7. A computer-based system for communication control, the computer-based system comprising:
a processor; and
a memory with computer code instructions stored thereon, the processor and the memory, with the computer code instructions, being configured to cause the computer-based system to implement a relay agent configured to:
receive a telephone call from a plain old telephone service (POTS) device, the telephone call comprising a telephone number corresponding to a destination device;
responsive to receiving the telephone call and prior to providing answer signaling for the received telephone call to the POTS device, establish a telephonic head-start connection between a proxy agent and the destination device, establishing the telephonic head-start connection including:
providing a ringing tone to the POTS device, the ringing tone indicating that (i) an attempt to connect the telephone call is being made and (ii) an attempt to establish the telephonic head-start connection between the proxy agent and the destination device is being made;
establishing a private network connection between the relay agent and the proxy agent;
transmitting, via the established private network connection, the telephone number to the proxy agent; and
receiving, via the established private network connection, a message from the proxy agent, the message indicating that the telephonic head-start connection has been established between the proxy agent and the destination device;
responsive to establishing the telephonic head-start connection, utilize the established private network connection to create a real-time telephonic connection between the POTS device and the destination device by providing the answer signaling for the received telephone call to the POTS device;
monitor transmissions on the real-time telephonic connection between the POTS device and the destination device to identify one or more errors in a given transmission; and
correct the one or more errors in the given transmission.

8. The computer-based system of claim 2, wherein the one or more errors are identified based on a discrepancy between a communications protocol and the given transmission.

9. The computer-based system of claim 8, where, in correcting the one or more errors in the given transmission, the processor and the memory, with the computer code instructions, are configured to cause the computer-based system to:
modify the given transmission to be in accordance with the communications protocol.

10. The computer-based system of claim 9, wherein the one or more errors include at least one of: a missing packet, an out-of-order packet, and a mistimed packet.

11. The computer-based system of claim 7 where, in correcting the one or more errors in the given transmission, the processor and the memory, with the computer code instructions, are configured to cause the computer-based system to perform at least one of: (i) inserting one or more packets into the given transmission, (ii) reordering one or more packets of the given transmission, and (iii) modifying a tone frequency of one or more packets of the given transmission.

12. The computer-based system of claim 7, wherein the processor and the memory, with the computer code instructions, are further configured to cause the computer-based system to:
create a secure tunnel by encrypting the real-time telephonic connection.

13. A non-transitory computer program product for communication control, the non-transitory computer program product comprising a computer-readable medium with computer code instructions stored thereon, the computer code instructions being configured, when executed by a processor, to cause an apparatus associated with the processor to implement a relay agent configured to:
receive a telephone call from a plain old telephone service (POTS) device, the telephone call comprising a telephone number corresponding to a destination device;
responsive to receiving the telephone call and prior to providing answer signaling for the received telephone call to the POTS device, establish a telephonic head-start connection between a proxy agent and the destination device, establishing the telephonic head-start connection including:
providing a ringing tone to the POTS device, the ringing tone indicating that (i) an attempt to connect the telephone call is being made and (ii) an attempt to establish the telephonic head-start connection between the proxy agent and the destination device is being made;
establishing a private network connection between the relay agent and the proxy agent;
transmitting, via the established private network connection, the telephone number to the proxy agent; and
receiving, via the established private network connection, a message from the proxy agent, the message indicating that the telephonic head-start connection has been established between the proxy agent and the destination device;
responsive to establishing the telephonic head-start connection, utilize the established private network connection to create a real-time telephonic connection between the POTS device and the destination device by providing the answer signaling for the received telephone call to the POTS device;

monitor transmissions on the real-time telephonic connection between the POTS device and the destination device to identify one or more errors in a given transmission; and correct the one or more errors in the given transmission.

14. The non-transitory computer program product of claim 13, wherein the one or more errors are identified based on a discrepancy between a communications protocol and the given transmission.

\* \* \* \* \*